United States Patent Office 2,782,202
Patented Feb. 19, 1957

2,782,202

PRODUCTION OF DRY N,N-DIISOPROPYL-2-BENZOTHIAZOLESULFENAMIDE

Robert E. Henderson, Cuyahoga Falls, Ohio, assignor to The Goodyear Tire & Rubber Company, Akron, Ohio, a corporation of Ohio No Drawing. Application September 27, 1955,
Serial No. 537,066

2 Claims. (Cl. 260—306.6)

This invention relates to a method for preparing N,N-diisopropyl-2-benzothiazolesulfenamide. More particularly it relates to a method for recovering and purifying N,N-diisopropyl-2-benzothiazolesulfenamide.

One method for preparing N,N-diisopropyl-2-benzothiazolesulfenamide is by reacting 2,2'-bis benzothiazoledisulfide with N-chloro diisopropylamine in the presence of diisopropylamine in a solvent such as substantially anhydrous methanol. The product as formed is in solution. It is usually recovered by cooling the solution, seeding and crystallizing while adding cold water to insolubilize the sulfenamide. The sulfenamide is in a mixture of the solvent, water, some unreacted starting materials and the by-product, diisopropylamine hydrochloride, formed in the reaction. The sulfenamide is generally freed from these extraneous materials by filtering, washing with water and drying on trays in an oven or some other suitable drying apparatus. Since the sulfenamide is low melting, drying must be at a low temperature which requires a long time in the drying cabinet or tunnel.

N,N-diisopropyl-2-benzothiazolesulfenamide is somewhat unstable and in the presence of water, particularly when warm, tends to undergo hydrolysis and decomposition reactions, so that in the above process some of the N,N-diisopropyl-2-benzothiazolesulfenamide is decomposed in the drying process. Impurities are produced in the sulfenamide which act as catalysts for the further decomposition of the sulfenamide.

According to this invention N,N-diisopropyl-2-benzothiazolesulfenamide is purified and dried by adding warm water to a mixture containing the sulfenamide and separating the sulfenamide in molten or liquid state from the aqueous phase by centrifuging while maintaining the water-sulfenamide mixture at a temperature above the melting point of the sulfenamide until the sulfenamide is separated from the mixture. In practice, it is desirable to preheat the centrifuge. Any type of centrifuge suitable for effecting the separation of liquids can be employed. In the examples below a solid bowl type of centrifugal separator was used.

The process of the invention is illustrated by the following examples.

Example 1

N,N-diisopropyl-2-benzothiazolesulfenamide was prepared in methanol solution by reacting 2,2'-bis benzothiazoledisulfide, N-chloro diisopropylamine and diisopropylamine in methanol. The mixture obtained was a clear dark solution which contained the sulfenamide, diisopropylamine hydrochloride, methanol and small amounts of unconsumed reactants. Warm water at a temperature of 60 to 65° C., in an amount equal to three times the weight of the 2,2'-bis benzthiazoledisulfide, was added to the solution and the mixture was agitated for 15 minutes and then allowed to stand to let the sulfenamide separate from the aqueous phase. The molten sulfenamide was drawn off from the bottom of the mixing vessel. Such sulfenamide has a moisture content of from 6 to 10%. The wet, molten sulfenamide was fed into a steam-jacketed, tubular bowl centrifugal separator operated at 60° C. and atmospheric pressure. The sulfenamide which was thus separated from the mixture and from the water was obtained in a pure form and contained less than 0.2% water.

In Example 1 above the sulfenamide was separated in concentrated form from the aqueous mixture before being fed to the centrifuge. If desired, the sulfenamide-aqueous mixture can be fed directly to the centrifugal separator as shown in Example 2 below.

Example 2

The sulfenamide - diisopropylamine hydrochloride-methanol mixture obtained in the preparation of N,N-diisopropyl-2-benzothiazolesulfenamide as in Example 1 was maintained at a temperature of about 58° C. Water at 65° C. in an amount equal to three times the amount of 2,2'-bis benzothiazoledisulfide used in the reaction was added to the sulfenamide solution and the mixture was agitated for 15 minutes. Agitation was continued and the mixture was fed to the centrifugal separator operated at 60° C. and at atmospheric pressure. The purified sulfenamide obtained contained only 0.2% moisture.

The examples above have shown the process as applied to a solution of the sulfenamide in a solvent such as methanol. The process can also be used with sulfenamide prepared by other methods. Thus, it can be used to purify sulfenamide containing no solvent by melting the sulfenamide, slurrying with warm water and then centrifuging as in the examples above to remove the water and impurities.

By the method of this invention N,N-diisopropyl-2-benzothiazolesulfenamide can be prepared in substantially anhydrous condition, i. e. containing less than 0.4% of water and usually 0.2% or less of water. The temperatures given for the water added in the examples above were for purposes of illustration. Water at higher temperature can be used if desired. As a practical matter, the temperature will ordinarily not be greater than 100° C. It is necessary to use water at a temperature sufficiently high to keep the sulfenamide in molten state until it has been separated from the extraneous materials. The melting point of the pure sulfenamide is about 56–58° C. The usual commercial grade sulfenamide has a melting point of about 50–55° C.

While certain representative embodiments and details have been shown for the purpose of illustrating the invention, it will be apparent to those skilled in this art that various changes and modifications may be made therein without departing from the spirit or scope of the invention.

I claim:

1. The process of producing substantially dry N,N-diisopropyl-2-benzothiazolesulfenamide which comprises adding water to an N,N-diisopropyl-2-benzothiazolesulfenamide-containing mixture and separating the N,N-diisopropyl-2-benzothiazolesulfenamide from the water phase by centrifuging, while maintaining the water-sulfenamide mixture at a temperature sufficiently high to keep the N,N-diisopropyl-2-benzothiazolesulfenamide in molten state until the sulfenamide has been separated from the water phase.

2. The process of producing substantially dry N,N-diisopropyl-2-benzothiazolesulfenamide which comprises adding water to a solution containing N,N-diisopropyl-2-benzothiazolesulfenamide to cause the sulfenamide to separate, agitating the mixture, and separating the sulfenamide from the water phase by centrifuging, while maintaining the water-sulfenamide mixture at a temperature sufficiently high to keep the sulfenamide in molten state until the sulfenamide has been separated from the water phase.

References Cited in the file of this patent

UNITED STATES PATENTS 2,417,989    Moore et al. _____ Mar. 25, 1947